United States Patent [19]
Bonnet et al.

[11] Patent Number: 6,054,667
[45] Date of Patent: Apr. 25, 2000

[54] METHOD OF MANUFACTURING METAL TUBES

[75] Inventors: Christian Bonnet, Saint Gervais; Denis Astier, Ennery, both of France

[73] Assignee: La Soudure Autogene Francaise, Paris Cedex, France

[21] Appl. No.: 09/121,675

[22] Filed: Jul. 23, 1998

[30] Foreign Application Priority Data

Jul. 25, 1997 [FR] France ................................. 97 09512

[51] Int. Cl.$^7$ ................................................ B23K 9/167
[52] U.S. Cl. ................................................ 219/61; 219/75
[58] Field of Search ............................ 219/61, 125.11, 219/130.1, 137 R, 60 R, 75, 121.14

[56] References Cited

U.S. PATENT DOCUMENTS

| | | | |
|---|---|---|---|
| 1,872,008 | 8/1932 | Richter | 219/61 |
| 3,131,284 | 4/1964 | Gibson | 219/61 |
| 3,349,213 | 10/1967 | Gorman. | |
| 3,931,489 | 1/1976 | Roderburg et al. | 219/60 R |
| 4,396,820 | 8/1983 | Puschner | 219/121.14 |
| 4,811,888 | 3/1989 | Ziemek et al. | 219/60 R |

FOREIGN PATENT DOCUMENTS

| | | |
|---|---|---|
| 1408975 | 7/1965 | France . |
| 59-113996 | 6/1984 | Japan . |
| 876352 | 8/1961 | United Kingdom . |
| 2 080 158 | 2/1982 | United Kingdom . |

*Primary Examiner*—Clifford C. Shaw
*Attorney, Agent, or Firm*—Young & Thompson

[57] ABSTRACT

A device and a method of manufacturing a metal tube made from a metal sheet with two substantially straight and parallel longitudinal edges, in which method the two longitudinal edges of the metal sheet are welded together using a welding method employing at least one electric arc between at least one electrode ($E_i$) and the metal sheet in contact with at least one ground lead ($PM_i$), in which the plane of each ground lead ($PM_i$) is positioned a distance ($e_i$) of between −5 mm and +25 mm with respect to the plane of each corresponding electrode ($E_i$), the positive direction being the direction of relative travel of the metal sheet with respect to the at least one electrode ($E_i$).

16 Claims, 5 Drawing Sheets

METHOD OF MANUFACTURING METAL TUBES

FIELD OF THE INVENTION

The invention relates to a method and to a device for manufacturing welded metal tubes, it being possible for the tubes to contain one or more fillers, such as powders, granules or mixtures thereof. After welding, the tubes obtained can be subsequently rolled, drawn and/or undergo an intermediate baking, all with a view to conferring upon them a shape that is compatible with the use for which they are intended. The method and the device of the invention may be used, in particular, for manufacturing filled wires intended for electric-arc welding.

BACKGROUND OF THE INVENTION

Customarily, to manufacture a metal tube continuously and on an industrial scale, use is made of a metal sheet or strip, the width and thickness of which are suited to the tube which is to be produced, that is to say are compatible with the end-use of the tube.

To do this, the metal sheet or strip is placed on a device that allows the metal sheet to be given a non-zero rate of travel along its longitudinal axis. As it travels, a succession of rollers gives this strip, first of all, a substantially U-shape, then a substantially O-shape, by bringing the two longitudinal edges of the strip closer together, the two longitudinal edges being substantially straight and parallel to one another.

When the tube has to contain fillers such as powders, granules or mixtures thereof, these are introduced into the tube when it is in the U-shape.

These fillers are introduced by means of a belt on which the fillers are placed and which runs in synchrony with the progression of the strip, so that the fillers are continuously tipped from the belt into the channel that the U-tube forms. The amount of fillers tipped out by the belt is altered by adjusting the height of the fillers on the belt.

Next, as before, a new series of rollers allows the tube to be given its O-shape, that is to say its substantially cylindrical shape.

The two longitudinal edges of the strip, which find themselves facing each other, are generally joined by welding the said edges together.

At the present time, at least two welding methods are used industrially, namely the high-frequency welding method and the multi-cathode TIG method.

However, these each have a certain number of drawbacks.

Thus, when use is made of a high-frequency welding method for welding the longitudinal edges of a tube containing powders that are not completely non-magnetic, these powders are "drawn" by the effect of the very intense magnetic field created by the high-frequency welding current and then contaminate the weld, causing defects which lead to greater weakness of the welded joint which can then no longer withstand without rupturing later transformations, such as subsequent drawing and/or rolling stages.

Documents EP-A-0158691, EP-A-0158693, EP-A-0589470, U.S. Pat. No. 4,584,169, U.S. Pat. No. 4,632,882 and U.S. Pat. No. 5,192,016 have already emphasized this problem and attempted to provide solutions. However, none of these solutions is truly satisfactory from the industrial point of view because these solutions impose, in particular, tight constraints on the filler powders to be used or require very expensive and not very profitable investment.

An alternative lies in the multi-cathode TIG welding method, which is used for manufacturing tubes made of non-ferromagnetic material, such as austenitic stainless steels or copper-containing alloys.

In general, this technique employs three electrodes aligned in the direction of travel of the tube and distant from one another by a constant value which should ideally be reduced to the minimum, but which depends on the size of the various constituent members, on requirements for electrical insulation of the electrodes and on requirements for cooling the entire assembly.

Welding rates for multi-cathode TIG welding depend, in particular, on the thickness of the welded joint and on the nature of the material, therefore on the thermal diffusivity. However, for similar geometries, when both methods can be used, high-frequency welding can be carried out at far higher speeds than multi-cathode TIG welding.

This is because, in high-frequency welding, the energy is generated across the entire thickness of the edges to be welded together, whereas in multi-cathode TIG welding, the energy of the arc is transmitted only to the surface of the edges and then has to diffuse through the thickness, so that the lower face can be brought up to a temperature higher than the melting point of the material in question.

Put another way, the multi-cathode TIG method leads to far lower productivity than high-frequency welding, thereby penalizing its industrial benefit.

Furthermore, the multi-cathode TIG method presents a major drawback, namely the phenomenon of "magnetic blow", which is manifested by uncontrolled interactions between the electric arcs, which interactions force a limitation of the strengths of current employed in each of the electrodes and therefore, as end-result, force a considerable reduction in welding rates.

Now, weld penetration, that is to say the thickness of strip that can fuse in order to weld the two edges together, depends in particular on the strength of the current used in the multi-cathode TIG method and on the rate of welding.

All other things being equal, weld penetration is a function of the welding energy (E), which can be expressed by formula I below:

$$E = \sum_{i=1}^{n} \frac{Ui \cdot Ii}{Vs} \quad (I)$$

in which:

Ui is the welding voltage (in volts) of cathode i;

Ii is the strength (in amps) of the current passing through the cathode i;

Vs is the rate of welding (in $cm.s^{-1}$);

and n is the number ($n \geq 1$) of cathode(s) i used.

The welding energy E is then expressed in $J.cm^{-1}$.

From this it will be understood that if the rate of welding is to be increased while maintaining the same penetration, it is necessary to increase the welding energy, that is to say the power delivered by the generator or generators by increasing the current and/or the voltage on one or more of the cathodes.

However, in practice, it is difficult to gain a significant advantage from increasing the voltage because in a multi-cathode TIG welding method, the voltage is an increasing function of the arc height.

Now, a tall arc is not favourable to high-speed welding. This is because a tall arc leads to a reduction in the power density of the arc at the surface of the workpiece, and this has the effect, all other things being equal, of broadening the bead of welding and therefore decreasing the penetration, something which goes against the desired objective.

Furthermore, a longer arc is, on the one hand, more sensitive to magnetic interactions generating a deflection of this arc and, on the other hand, tends to attach more readily and for longer to the hot spot, that is to say to the molten metal, and this first of all results in a lengthening and bending of the arc, then leads to sudden detachment of the arc when the anode spot, that is to say the root of the arc, repositions itself vertically in line with the cathode. This then yields a discontinuous weld characteristic of an excessively high welding rate.

The result of this is that the increase in power of the electric arc, needed to maintain penetration, can be the result only of an increase in current.

Now, when the current is significantly increased, on one or more of the cathodes employed, there is observed increased instability of the electric arcs and the formation of a weld bead which is very "wavy" that is to say comprises a series of craters and lumps on the surface of the weld bead.

This phenomenon is known as "magnetic blow".

It will be readily understood that such a "wavy" weld bead is not able to allow subsequent rolling and/or drawing that is free of problems of rupturing.

Furthermore, other problems arise when the tube to be welded has been filled with fillers, for example metal powder.

In this case, carrying out full-penetration welding using a multi-cathode TIG method causes, somewhat randomly, partial fusion of the filler it contains and/or contamination of the molten metal which should normally be the result only of the melting of the strip.

It then follows that the tube can no longer be rolled and/or drawn without this operation causing rupture, given that:
- the contamination of the molten metal with the filler leads to the formation of defects or, at the very least, to the formation of a hard alloy which is weak and cannot be deformed without causing cracks, which cracks act as initiators for later rupture of the tube;
- the partial melting of the fillers inside the tube gives rise, after solidification, to large undeformable particles which damage the tube and may go so far as to cause it to rupture when, during a later rolling or drawing operation, the inside diameter of the tube becomes of the order of magnitude of the size of the particles resulting from the melting; and
- the volatilization of filler inside the tube causes some of the molten weld to be expelled outwards because of the increase in internal pressure in the tube.

Document U.S. Pat. No. 4,396,820 proposes a first solution to combat this phenomenon, namely that of lancing one of the edges to be assembled so as to allow the tube to be welded throughout its thickness without it being possible for the molten metal to come into contact with the fillers contained in the tube.

However, this method has the drawback of complicating the forming operation, of reducing the "free" volume inside the tube and of adversely affecting the axial symmetry of the tube.

Another solution might consist in performing welds with partial penetration, that is to say in causing only part of the thickness of the strip to melt at the two longitudinal edges which are to be welded together. However, welds with partial penetration are unanimously advised against by those skilled in the art because that part of the plane of the joint not welded constitutes a notch under the root of the weld bead, which is reputed to propagate during any reduction in section of the tube imposed by a subsequent drawing or rolling stage.

SUMMARY OF THE INVENTION

The object of the present invention is therefore to propose a method and device for manufacturing metal tubes which do not present the drawbacks of the prior art.

The invention therefore relates to a method of manufacturing a metal tube made from a metal sheet with two substantially straight and parallel longitudinal edges, in which method the two longitudinal edges of the metal sheet are welded together using a welding method employing at least one electric arc between at least one electrode (Ei) and the metal sheet in contact with at least one ground lead (PMi), in which the plane of each ground lead (PMi) is positioned a distance ($e_i$) of between −5 mm and +25 mm with respect to the plane of each corresponding electrode (Ei), the positive direction being the direction of relative travel of the metal sheet with respect to the at least one electrode (Ei).

In the context of the present invention, the distance called (ei) between the plane of the electrode and the plane of the ground lead is the distance separating the plane passing through the end of each electrode (Ei) and perpendicular to the tube, from the plane passing through the end of each corresponding ground lead (PMi) and perpendicular to the said tube; the planes (PEi) and (PPMi) are therefore parallel to one another.

As the case may be, the method of the invention comprises one or more of the following features:
- the electrode-plane/ground lead-plane distance (ei) is between 0 mm and +20 mm and preferably between +7 mm and +15 mm;
- use is made of at least two electrodes (Ei) and of at least two corresponding ground leads (PMi) and, preferably, of at least three electrodes (Ei) and of at least three corresponding ground leads (PMi);
- the separations between the electrodes are adjusted in order to ensure that the foot of each electric arc attaches to solidified metal;
- the separation between successive ($E_1$) and ($E_2$) electrodes is less than or equal to the separation between successive (E2) and ($E_3$) electrodes;
- the intensity of the current passing through an electrode is greater than or equal to 50 A, and preferably greater than or equal to 100 A;
- the relative speed of travel of the sheet is greater than or equal to 2 m.s$^{-1}$, preferably greater than or equal to 5 m.s$^{-1}$;
- it further comprises a stage of chamfering at least part of the two longitudinal edges of the metal sheet, so that it presents, prior to welding, a V-shaped groove with a V-angle (α) of between about 30° and about 120°, preferably between about 60° and about 90°;
- the groove has a height of between about ⅓ and about ⅔ of the thickness of the metal sheet;
- the metal sheet is filled with at least one filler prior to welding;
- the two longitudinal edges of the metal sheet are welded together incompletely by partial fusion of about 20% to about 80% of the thickness of the sheet at the edges and, preferably, of about 40% to about 60%;

the edges are also forge-welded together by applying a lateral mechanical pressure to at least part of the outside wall of the sheet, so as to obtain a substantially complete weld throughout the thickness;

after welding the tube undergoes at least one stage of drawing, rolling and/or recrystallization annealing.

The invention also relates to a device for manufacturing a metal tube from a metal sheet with two substantially straight and parallel longitudinal edges, comprising electric-arc welding means for welding together the two longitudinal edges of the metal sheet, employing at least one electrode (Ei) and at least one corresponding ground lead (PMi), each ground lead (PMi) being positioned at a distance ($e_i$) of between −5 mm and +25 mm with respect to each electrode (Ei), the positive direction being the direction of relative travel of the metal sheet with respect to the at least one electrode (Ei).

Furthermore, the invention also relates to a metal tube and/or to a filled wire that can be obtained by the above-described method.

According to another aspect, the invention also relates to the use of the aforementioned filled wire in a welding method chosen from TIG, MIG, MAG and submerged-arc welding.

BRIEF DESCRIPTION OF THE DRAWINGS

The features of the present invention are set forth in the following description, reference being made to the accompanying drawing in which.

DETAILED DESCRIPTION OF THE INVENTION

The invention will now be described in greater detail with the aid of examples which are given by way of non-limiting illustration, and with reference to the appended figures.

EXAMPLE I

Example 1 is intended to study the influence of the position of the ground lead or leads (PMi) with respect to the electrodes (Ei) on the speed (V) of welding and on the appearance of the welded joint obtained.

This example was carried out using a multi-cathode TIG welding torch with a shielding stream of gas, the gas used being an argon/hydrogen mixture of the Noxal 3™ type from Air Liquide, and the torch using 3 electrodes (E1, E2, E3) spaced 25 mm apart.

More specifically, and as diagrammatically depicted in FIGS. 1 to 6, a metal tube T is formed, continuously, successively into a "U" (not depicted) then into a "O" by bringing closer together the two longitudinal edges BL and BL' of a metal sheet moving at a non-zero rate V of travel in the direction of its longitudinal axis (arrow V in the figures).

The 3 electrodes E1, E2 and E3 acting as cathodes are connected to the negative poles of welding generators (not depicted), while the ground leads PM 1, PM2, PM2' and PM3 are connected, as the case may be, to the positive poles of 3 generators GN1, GN2 and GN3 so that electric arcs can be struck between the electrodes E1, E2 and E3 and the tube to be welded, which tube is connected to the positive poles of the generators GN1 and GN2 and GN3 via the ground leads PM1, PM2, PM2' and PM3 respectively.

The number and position of grounds leads vary depending on the figure studied.

The plane PJ of the welded joint resulting from bringing the 2 longitudinal edges BL and BL' of the metal sheet closer together, for example by the mechanical action at the surface of the tube T to be welded, of driving and pressing rollers (G1, G2, G3, G1', G2' G3'), is subjected to a welding operation by the simultaneous action of 3 electric arcs (not depicted) struck between the electrodes E1 to E3 and the tube T.

The weld S obtained is of an appearance and has penetration that vary depending on the operating conditions employed, which conditions are summarized in Tables I and II below, in which I1, I2 and I3 are the the current intensities through the electrodes E1, E2 and E3 respectively, V is the welding speed, and U is the welding voltage at the electrodes E1 to E3.

TABLE I

Figure 1:
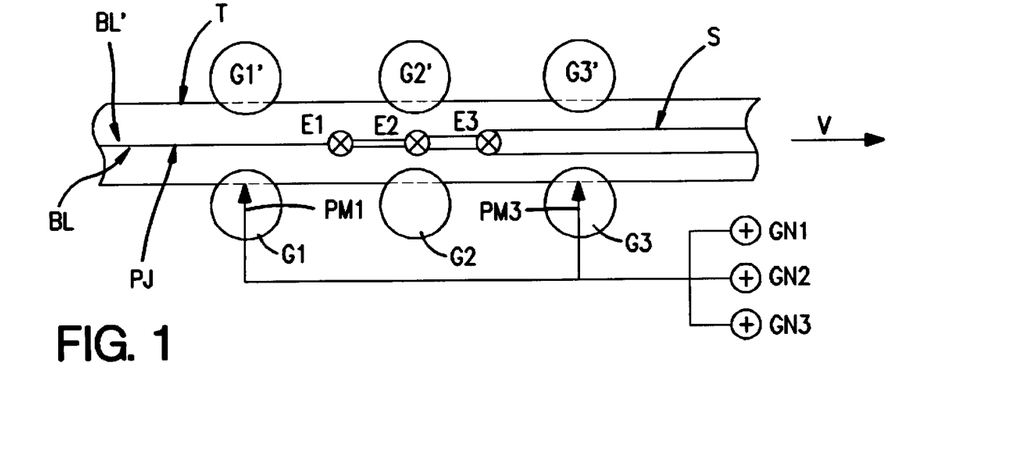
FIGS. 1–6 show welding electrode and grounding configurations according to the invention.
Figure 2:
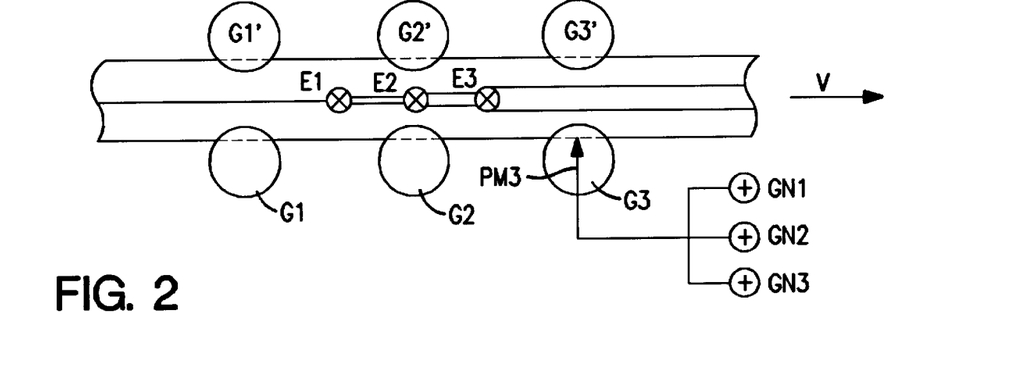
Figure 3:
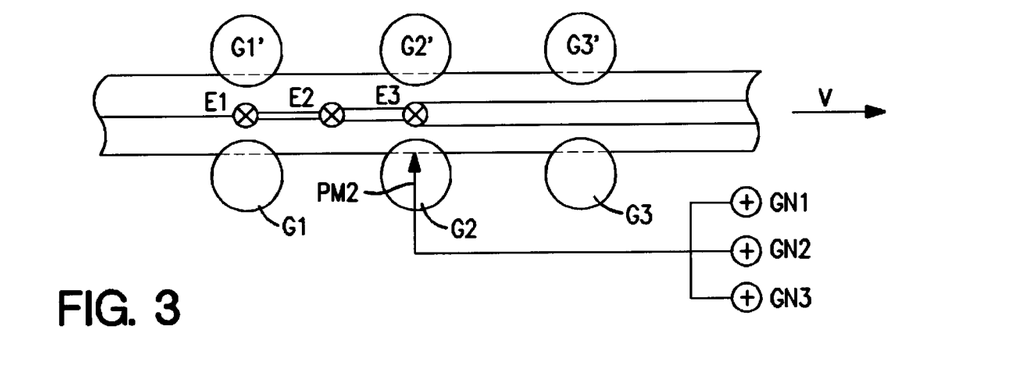
Figure 4:
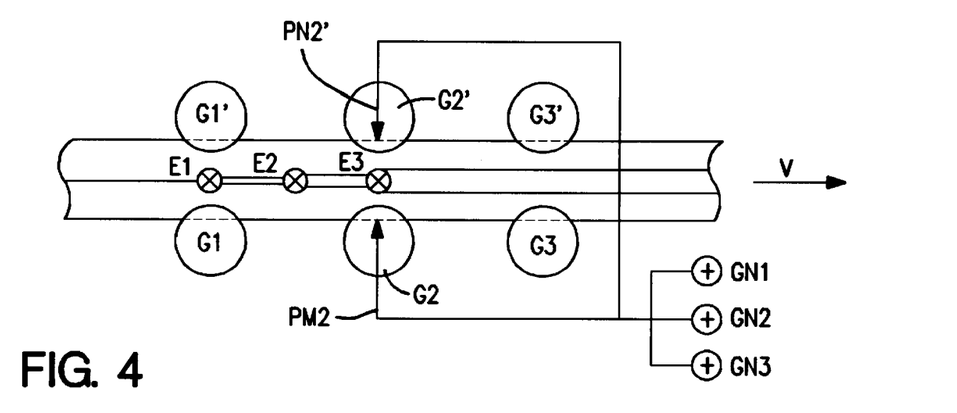

| TEST No. | CONFIGURATION ACCORDING TO | I1 (IN AMPS) | I2 (IN AMPS) | I3 (IN AMPS) | V (m · min$^{-1}$) | U (IN VOLTS) | WELD PENETRATION (%) | WELD | ELECTRIC ARCS |
|---|---|---|---|---|---|---|---|---|---|
| 1 | FIG. 1 | 100 | 140 | 200 | 2 | 13 to 15 | 50 | correct appearance | stable, inclined in the direction of travel |
| 2 | FIG. 1 | 100 | 140 | 250 | 2 | 13 to 15 | 50 | "wavy" appearance (succession of craters and lumps) | unstable |
| 3 | FIG. 2 | 100 | 140 | 250 | 2 | 13 to 15 | 50 | smooth and uniform appearance | stable |
| 4 | FIG. 3 | 100 | 140 | 250 | 3 | 13 to 15 | 50 | even appearance, but continuous channel along one side | lateral deflection |
| 5 | FIG. 4 | 100 | 140 | 250 | 3 | 13 to 15 | 50 | even and uniform appearance | stable |

TABLE I-continued

Figure 5:
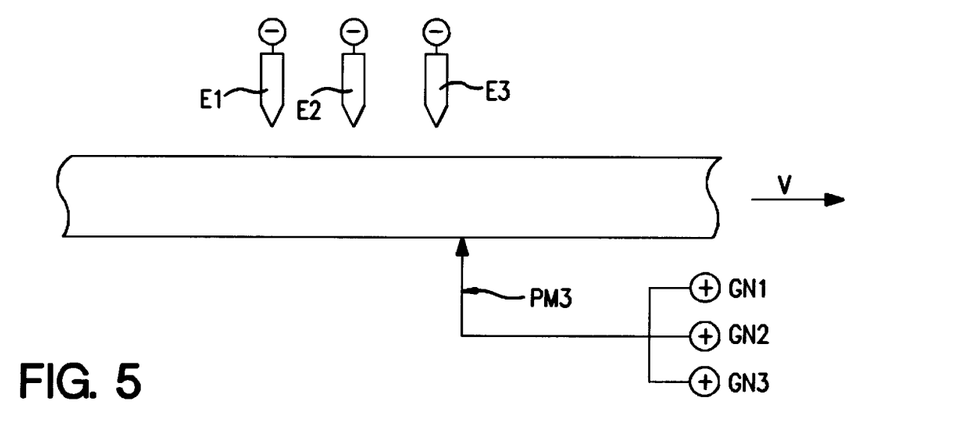
Figure 6:
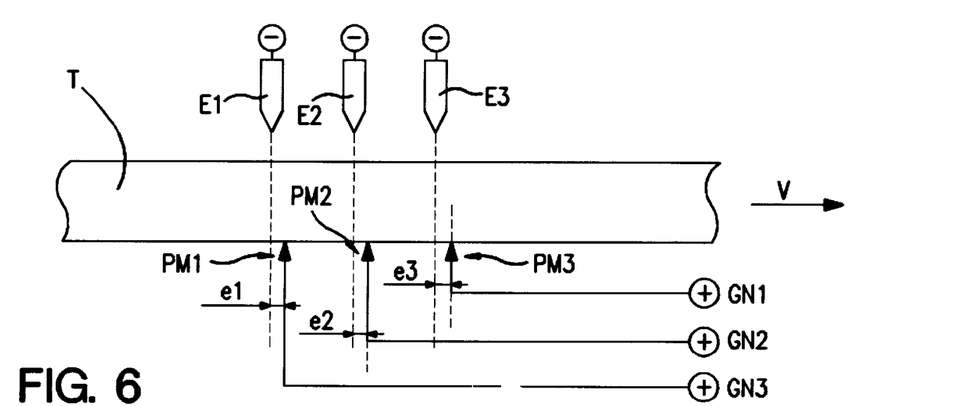

| TEST No. | CONFIGU- RATION ACCOR- DING TO | I1 (IN AMPS) | I2 (IN AMPS) | I3 (IN AMPS) | V (m · min⁻¹) | U (IN VOLTS) | WELD PENETRATION (%) | WELD | ELECTRIC ARCS |
|---|---|---|---|---|---|---|---|---|---|
| 6 | FIG. 5 | 150 | 180 | 280 | 4 | 13 to 15 | 40 | even appearance | problem with striking one of the arcs |
| 7 | FIG. 6 | 200 | 400 | 220 | 6.4 | 14 to 16 | 35 | even appearance - no defects | very good stability |

It can therefore be clearly seen from Table I above, that the path followed by the current through the tube during manufacture has a direct influence not only on the appearance of the weld bead, but also on the stability of the electric arcs; this influence being all the more pronounced, the higher the current employed.

Thus, even though Tests 1 and 2 differ only in the value of current I3, Test 2 leads to a weld bead of mediocre appearance and to great instability of the electric arcs.

However, Test 3 shows that these problems can be overcome by adopting the configuration depicted in FIG. 2, that is to say by keeping just one ground PM3, situated downstream of the electrodes E1 to E3; the weld bead returning to a uniform and smooth appearance.

Test 4 shows that when the welding speed is increased, adopting the configuration of FIG. 3, the other parameters remaining unchanged, there is observed, here too, a lateral deflection of the electric arcs, leading to a degradation in the appearance of the weld.

Nonetheless, it is possible to overcome these problems by adopting the configuration of FIG. 4, which differs from FIG. 3 only in the presence of an additional ground lead PM2' symmetric with the ground lead PM2, with respect to the tube.

It can be seen from these various tests that adopting a configuration which has symmetry both from the geometric and from the electrical viewpoint, with respect to the plane in which the electrodes are situated, makes it possible to obtain great flexibility in settings and to increase the strengths of the currents through the cathodes, and therefore the welding speed, and that this is true for given penetration and without problems of "magnetic blow" of the electric arcs, that is to say lateral deflection thereof.

It is clear from these tests that, to obtain a weld of a correct appearance and with stable electric arcs, it is necessary to position the ground lead or leads on the generatrix of the tube opposite the welding plane.

However, this condition is not sufficient by itself.

This is because, it has been observed, incidentally, that if a ground lead is placed inside the space separating the first electrode from the last, the flexibility in settings, the stability of the electric arcs, and the evenness of the weld beads are not as good as if the ground lead is positioned directly in line with the last electrode or even beyond, as depicted in FIG. 5 and adopting the parameters of Test 6.

However, although Test 6 allowed a weld bead of a satisfactory appearance to be obtained, difficulties with striking the central electrode were also observed.

Furthermore, the existence of just one ground lead results in the sum of the currents employed in the various electrodes causing fairly significant and lasting heating of the mobile area of contact between the tube, which is moving, and the ground lead, which is stationary.

It is possible to overcome this problem by controlling the paths taken by the currents through the tube and by minimizing the interactions between the arcs.

This can be achieved using a multiple-ground system, that is to say by employing several ground leads insulated from one another and each positioned opposite the electrode to which it corresponds, as depicted in FIG. 6 and tested in Test 7.

More specifically, Test 7 employs 3 electrodes E1 to E3, each associated with one of 3 earthing clamps PM1 to PM3, respectively.

If the distance separating the vertical line of the electrode $E_i$ from the position of the ground lead $PM_i$ (with i=1, 2 or 3) is termed $e_i$, as depicted in FIG. 6, it can be seen that the problems with striking electric arcs disappear completely when the distance $e_i$, is between −5 and +25 mm, the positive direction being the direction of relative travel of the tube with respect to the elements, as given by the arrow v.

As a preference, the flexibility in the electrical settings leads to an even better weld appearance when ei is between +7 and +15 mm; this also makes it possible to increase very substantially the currents employed and therefore the welding speed while maintaining very good electric-arc stability and a faultless weld bead appearance.

By way of indication, in FIG. 6, the distance e1 between electrode E1 and ground lead PM1 is of the order of 9 mm, the distance e2 is of the order of 10 mm and the distance e3 is of the order of 11 mm.

In order to verify Test 7, Test 8 was carried out using an eight-cathode torch, that is to say a torch using 8 electrodes and 8 ground leads each electrode being associated with one ground lead so that the distance $e_i$ separating each electrode Ei from each ground lead $PM_i$ is between −5 and +25 mm, or even between +7 and +15 mm.

In this Example 8, the configuration adopted is the same as the configuration of FIG. 6 and the welding parameters adopted are given in Table II below.

TABLE II

| TEST No. | I1 (A) | I2 (A) | I3 (A) | I4 (A) | I5 (A) | I6 (A) | I7 (A) | I8 (A) | U (V) | V m · min$^{-1}$ | WELD | ELECTRIC ARCS |
|---|---|---|---|---|---|---|---|---|---|---|---|---|
| 8 | 350 | 350 | 240 | 230 | 220 | 210 | 200 | 180 | 14 to 16 | 7 | even and fault-free appearance | very good stability |

This Test 8 confirms the observations of Test 7, namely that a weld of even and fault-free appearance and electric arcs with very good stability which strike without problem are obtained when the electrodes and their associated earthing plants are positioned in such a way that the distance ei is between −5 and +25 mm.

EXAMPLE 2

When the tube manufactured by means of the method of the invention is to be filled with filler such as powder, before it is formed into a O and then welded, and then perhaps subsequently rolled and/or drawn down to a service diameter, producing a weld with full penetration of the two longitudinal edges of the metal sheet forming the tube runs the risk of causing at least partial fusion of the fillers it contains and/or contamination of the molten metal.

In order to solve this problem of partial fusion of the filler contained in such a tube, such as a filled wire, it may be necessary to produce a weld with partial penetration, that is to say through just part of the thickness of the wall of the said tube.

In Example 2, a tube containing filler powder, that is to say a filled wire, 16.4 mm in diameter, is welded over a small proportion of its thickness (penetration of the order of 40 to 50% approximately) by means of a welding method employing several electrodes, such as a multi-cathode TIG method similar to those described for Example 1.

After welding, the tube undergoes stages of rolling, drawing, recrystallization annealing and final drawing down to a diameter of 1.2 mm.

Figure 7:
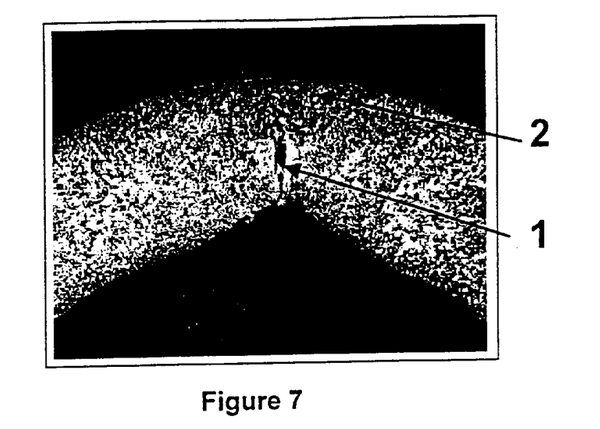
FIGS. 7, 8, and 13 show workpiece cross sections produced by the invention.
Figure 8:
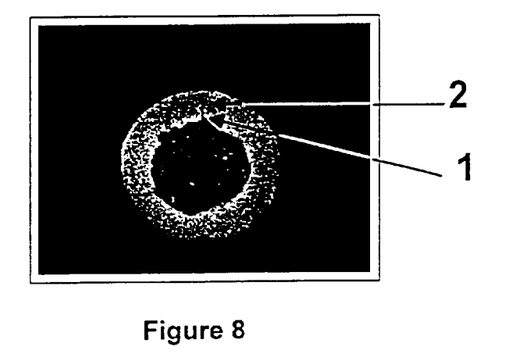

FIGS. 7 and 8 depict the filled wire obtained after welding and rolling down to a diameter of 12.7 mm (FIG. 7) , and after drawing down to a diameter of 1.2 mm (FIG. 8).

It can be seen, surprisingly, that the various stages in the deformation of the wire (rolling, drawing, etc.) do not cause any propagation of the crack 1 formed by that part of the plane of the joint that is not welded.

In fact, the initial ratio between the welded part 2 and unwelded part 1 is conserved, irrespective of the seen diameter, that is to say the diameter of the filled wire after deformation.

It is clear from this Example 2 that it is possible to reduce by rolling and/or drawing the section of a tube that is welded only over part of its thickness, and that this can be done without the risk of the filled wire rupturing through crack propagation.

Furthermore, this technique makes it possible to avoid any contamination of the weld by the powders contained in the tube and/or at least partial fusion of the powders contained in the tube.

This technique can also be applied to the welding of an empty tube because it allows a very significant increase in productivity given that, all other things being equal, the welding speed is a decreasing function of the desired penetration.

EXAMPLE 3

As explained in the preceding Example 1, the configuration of FIG. 6 allows a three-cathode torch to obtain a welded-joint of smooth and even appearance, and allows any problem of deflection or "magnetic blow" to be overcome. In the case of a six-cathode torch (electrodes E1 to E6), an increase in current on the tail-end electrodes (electrodes E4, E5 and/or E6) makes it possible to increase the welding speed, but upwards of a certain value of current intensity, a blockage of the "liquid pool" occurs upstream of these electrodes, which blockage of the "liquid pool" results in the formation of a run of metal upstream of the electrode E6.

This run of metal tends to reduce the distance separating the electrode from the liquid pool of molten metal and may, as it grows, short-circuit the electrode and destroy it.

Sometimes, the run of metal may run periodically under the electrode without destroying it, but in this case, the appearance of the weld is very much adversely affected by the presence of uneven lumps distributed along the entire length of the weld bead.

A careful observation of the process that leads to the formation of this run of metal shows that it occurs when one of the electric arcs strikes the molten metal, that is to say metal that has been melted by the electrodes situated upstream of the said arc and which has not yet solidified.

Tests 9 to 12, of which details are given in Table III below, were carried out using a six-cathode TIG torch with a spacing of about 25 mm between the various electrodes.

The configuration adopted in this Example 3 is similar to FIG. 6, that is to say the electrode E1 is the electrode furthest upstream and the electrode E6 is the one situated furthest downstream, when considering the direction of relative travel of the wire (in the direction of arrow V in FIG. 6).

TABLE III

| TEST No. | I1 (A) | I2 (A) | I3 (A) | I4 (A) | I5 (A) | I6 (A) | U (V) | V (m · min$^{-1}$) | RUN OF METAL |
|---|---|---|---|---|---|---|---|---|---|
| 9 | 220 | 220 | 170 | 170 | 170 | 170 | 14 to 16 | 6 | yes, upstream of electrode E6 |

TABLE III-continued

| TEST No. | I1 (A) | I2 (A) | I3 (A) | I4 (A) | I5 (A) | I6 (A) | U (V) | V (m · min$^{-1}$) | RUN OF METAL |
|---|---|---|---|---|---|---|---|---|---|
| 10 | 220 | 220 | 170 | 150 | 150 | 170 | 14 to 16 | 6 | no |
| 11 | 220 | 220 | 170 | 150 | 150 | 170 | 14 to 16 | 5.4 | yes, upstream of electrode E6 |
| 12 | 240 | 240 | 240 | 230 | 0 | 200 | 14 to 16 | 6 | no |

I1, I2, I3, I4, I5 and I6 are strengths of the current passing respectively through electrodes E1 to E6.

In the conditions of Test 9, the formation of a run of metal upstream of electrode E6 is observed.

However, as is clear from Test 10, a reduction in the strength of the current passing through electrodes E4 and E5, with no change to the strength of the current in electrode E6, causes this run of metal to disappear.

This can be explained by the fact that electrodes E4 and E5 transmit less energy to the tube in Test 10 than they do in Test 9, which means that the molten metal has more time to solidify before it reaches electrode E6, in Test 10, which means that the electric arc generated by electrode E6 starts from solidified metal (Test 10) rather than molten metal (Test 9).

It is clear from Test 11, that a reduction in welding speed, with no change to the other electrical parameters, causes an increase in welding energy and thus a decrease in the rate of cooling of the weld, with a run of metal appearing in front of electrode E6.

Put another way, unlike in Test 10, in Test 11, the weld is still in the liquid state when it passes under electrode E6, and the electric arc generated by electrode E6 therefore starts in molten metal, and this causes the formation of a run of metal. These observations are confirmed by Test 12.

What happens in Test 12 is that although the overall energy employed by the first 5 electrodes (E1 to E5) is the same as in Test 9, namely an overall current of 950 A, and although the current in the sixth electrode (E6) is higher in Test 12 (200 A) than in Test 9 (170 A), there is no run formed in Test 12, unlike Test 9. This can be explained by the fact that in Test 12 the molten metal has had time to solidify as it passes between electrodes E4 and E6, as electrode E5 has no current applied to it.

It is obvious from Tests 9 to 12 that the separation between the various electrodes must not merely be dictated by the requirements for electrical insulation, for cooling, or of pure mechanics, unlike common practice, but must also take account of a certain number of parameters that lead to optimization of the welding method and thus to optimization of the method of manufacturing the tube.

Now, in TIG welding, some of the energy of the electric arc is transferred to the surface of the workpiece. Disregarding the movements of the liquid pool, whose origins are various, but the main one of which is the Marangoni effect, that is to say a movement associated with the surface-tension gradient as a function of the temperature gradient between the centre and the edge of the molten area, the propagation of heat through the thickness of the workpiece, in this case the tube, is by conduction.

Thus, if there is a desire to obtain a given penetration, welding at a high speed, it is necessary to keep the surface of the weld bead at the highest possible temperature and for long enough for the fusion isotherm to have time to reach the desired penetration.

Now, the highest temperature that a molten material can reach is the boiling point of the most volatile element of the material. For example, in the case of steels, the most volatile element is, in general, manganese whose boiling point is of the order of 2060°C.

It can thus be seen that in order to optimize the energy efficiency of a welding method which proceeds by conduction at the same time as the speed at which the welding is carried out, it is necessary to have a continuous supply of energy, so that the surface is kept close to the boiling point for enough time for the "fusion temperature" isotherm to reach the desired depth, that is to say thickness.

Put another way, it is necessary to employ a linear energy source of high power at its origin, so that the metal is quickly brought up to the boiling point of the most volatile element, then of lower power thereafter, given that all that is required is compensation for losses that are due to conduction and radiation.

The result of this is that the length of this source of energy depends only on the welding speed, on the desired penetration and on the thermal properties of the material, such as the diffusivity.

In this particular instance, that is to say for multi-cathode welding, it is thus clear that:

the highest current strengths have to be concentrated in the electrodes furthest upstream, so as to supply enough energy to bring the surface of the welded point to a high temperature;

the number of electrodes will need to be higher, the faster it is desired for welding to proceed;

the distance between the various electrodes must be set so that the anode foot of the electric arcs attaches to a metal which is only just solidified, so as to prevent the formation of the runs described earlier, while at the same time ensuring a minimum temperature variation at the surface of the welded joint;

the strength of the current passing through the tail-end electrodes, that is to say those situated furthest downstream, must be adjusted to supply just enough energy to allow the surface temperature of the material to be welded to be raised up to the boiling point of the most volatile element of the welded joint.

FIGS. 9a and 9b and 10a and 10b confirm the need to have an increasing separation between the cathodes in order to ensure that the feet of each electric arc will attach to solidified metal.

Figure 9A:
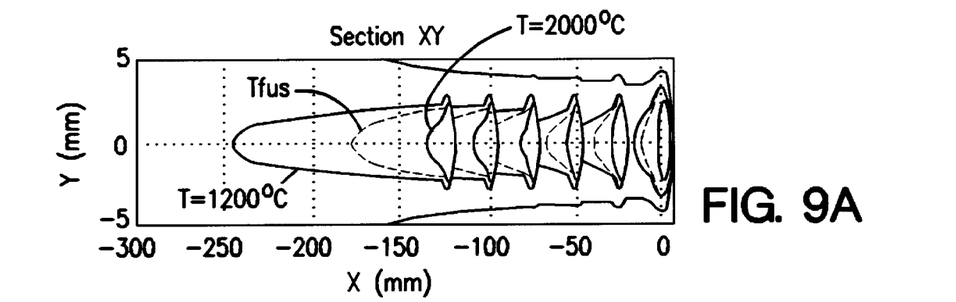
FIGS. 9a, 9b, 10a, 10b, 11, and 12 show the relationships between various parameters in the process of the invention.
Figure 9B:
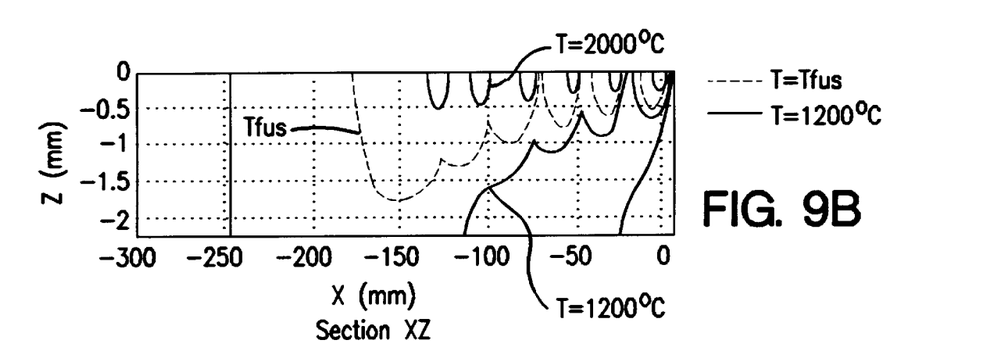

More specifically, FIGS. 9a and 9b depict isotherms at 2000° C., at the melting point of 1535° C. (Tfus) and at 1200° C., which isotherms have been calculated on the basis of heat-propagation equations and which have been positioned in the corresponding plane either at the surface of the bead, that is to say at a sectional view on axes X and Y with Z=0 (FIG. 9a), or in the perpendicular plane passing through the axis of the bead, that is to say along axes X and Z with Y=0 (FIG. 9b).

The torch used to obtain the welded joint depicted in FIGS. 9a and 9b is a six-cathode torch, the electrodes E1 to E6 of which are separated from one another by a distance equal to about 25 mm, and have the following currents passing through them: I1=350 A, I2=225 A, I3=200 A, and I4=I5=I6=250 A, respectively.

Furthermore, the welding speed is 8 m.s$^{-1}$ and the tube to be welded is about 2.2 mm thick.

It is clearly evident from FIGS. 9a and 9b that, this being the case, the electrodes E5 and E6 are situated above the pool of liquid metal formed by at least partial fusion of the edges of the tube to be welded by means of the electrodes E1 to E4 which precede them, which means that a run of metal will be formed at the surface of the weld bead, as mentioned earlier.

Figure 10A:
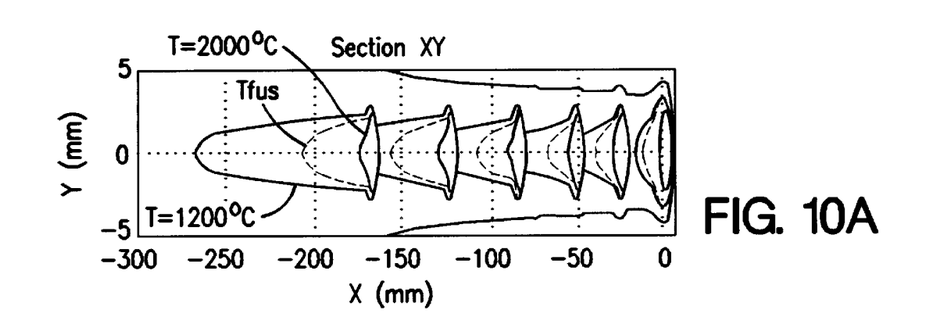
Figure 10B:
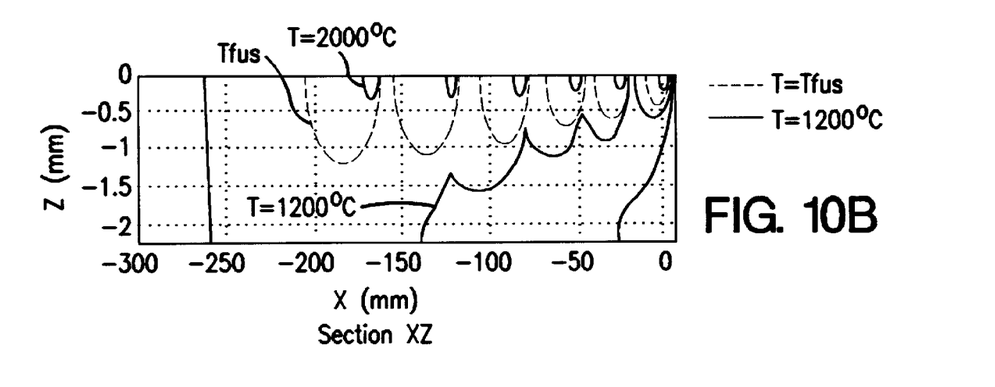

FIGS. 10a and 10b are similar to FIGS. 9a and 9b, except for the fact that in this case the electrodes are no longer equidistant from one another.

More specifically, the distance between electrode E1 and E2 and that between electrode E2 and E3 are equal to 25 mm, given that, as we saw earlier, these electrodes are not situated above a pool of liquid metal.

However, the distance between E3 and E4 has been extended to 30 mm, that between E4 and E5 to 40 mm and that between E5 and E6 to 45 mm.

It is clearly evident in the light of FIGS. 10a and 10b that increasing the distances separating the last electrodes (E4 to E6) while maintaining the same current intensities and same welding speed, makes it possible to obtain melting-point isotherms which are distinct for each electrode, that is to say a striking of the various electric arcs relating to each electrode on solidified metal (FIGS. 10a and 10b) rather than on molten metal (FIGS. 9a and 9b).

EXAMPLE 4

As we saw in Example 3, when a multi-cathode welding method is used, the penetration in the molten region depends on the conduction of heat from the surface of the tube towards its inside, that is to say along its thickness.

Hence, when the tube thickness increases, the penetration decreases not only in terms of relative values, that is to say as a percentage of the thickness, but also in terms of absolute values, that is to say that for the same welding speed and for the same welding current the penetration is more effective, the smaller the thickness.

Figure 11:
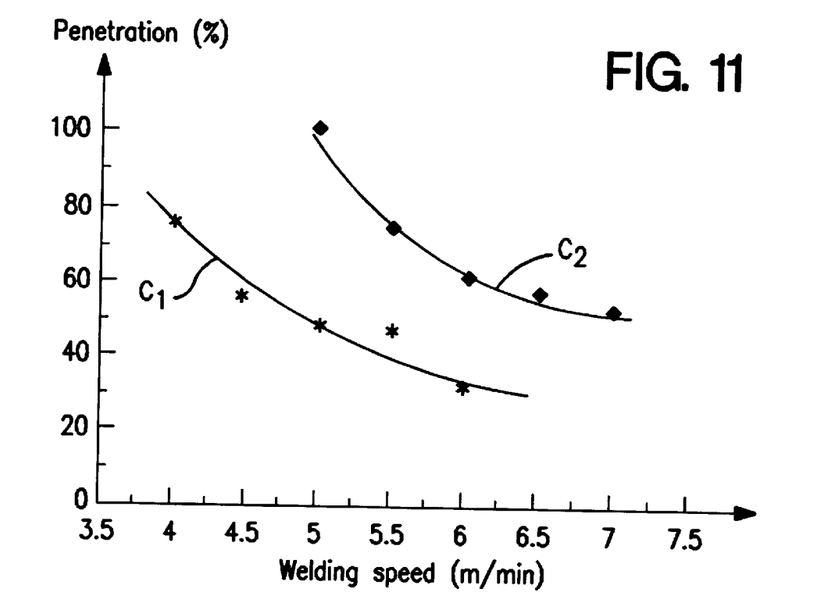
Figure 12:
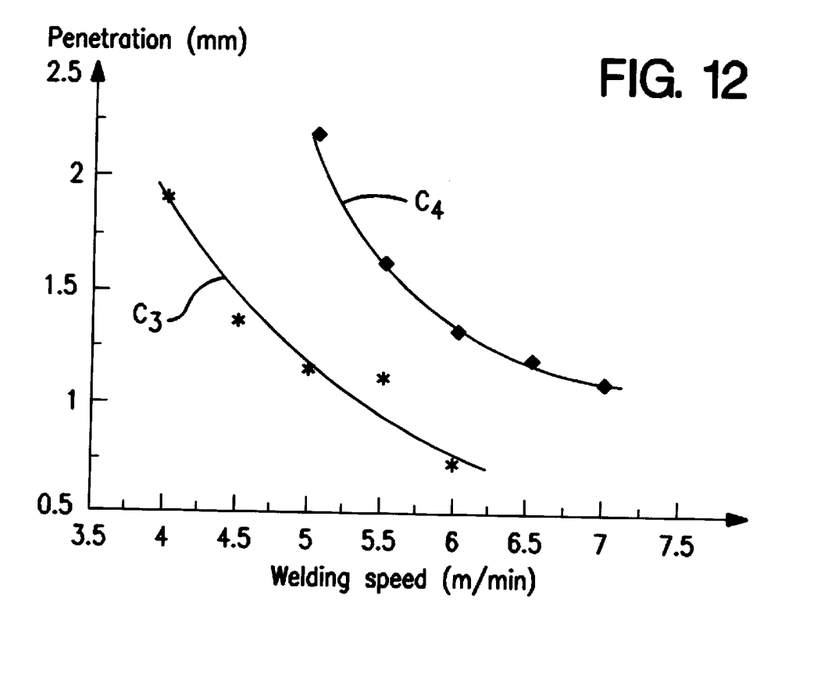

This is in any case confirmed by FIGS. 11 and 12 which illustrate penetration effectiveness (in % and in mm, respectively) as a function of the welding speed of a seven-cathode TIG method and in the case of two tubes of different thickness.

More specifically, curves C1 and C3 were obtained with a tube 2.5 mm thick, and curves C2 and C4 with a tube 2.2mm thick; in all instances, the strengths of the current passing through the various electrodes E1 to E7 were respectively as follows: I1=320 A, I2=300 A, I3=I4=I5=I6=I7=220 A.

Tests 13 to 16, details of which are given in Table IV below, were aimed at investigating the influence of a chamfering of the longitudinal edges of the tube to be welded together.

Tests 13 and 16 were carried out using a seven-cathode TIG method, electrodes E1 to E6 of which respectively had the following currents passing through them: I1=360 A, I2=320 A, I3=250 A, I4=220 A, I5=190 A and I6=180 A.

Furthermore, the welding voltage was of the order of 14 to 16 v, the welding speed of the order of 6 m.min$^{-1}$ and the tube to be welded was about 2.5 mm thick.

TABLE IV

| TEST No. | PENETRATION (in %) | ANGLE α OF THE GROOVE | HEIGHT OF THE HEEL (in mm) |
| --- | --- | --- | --- |
| 13 | 40 | — | — |
| 14 | 50 | 30° | 1.3 |
| 15 | 60 | 60° | 1.3 |
| 16 | 80 | 90° | 1.3 |

It is clearly obvious from Table IV above that chamfering the edges of the tube makes it possible to increase the weld penetration.

Put another way, all other things being equal, the penetration can be increased or, for the same penetration, the welding speed can be increased, by contriving for the energy supplied by the first cathodes to be transferred no longer to the surface of the tube, but partially at least to its thickness, something that can be achieved by chamfering the edges of the tubes prior to welding.

It can also be seen, from Table IV, that for the same heel height (1.3 mm), that is to say the same height of unchamfered edge, the effectiveness of the penetration increases in proportion to the V-angle (α) of the groove, the groove being substantially V-shaped.

Advantageously, it is chosen to produce a groove with a height h or heel of between about ⅓ and about ⅔ of the thickness of the metal sheet from which the tube is made.

EXAMPLE 5

As we saw in the previous examples, and as illustrated, in particular, in FIGS. 7 and 8, producing a weld with partial penetration allows a crack to remain under the welded joint (reference 1 in FIG. 7).

Now, in some instances, it may be preferable to obtain a tube that is welded through its entire thickness, that is to say that is substantially free of such a crack.

To do this, all that is required is for the weld produced by fusion of the upper part of the joint to be supplemented by forge-welding of the lower part; a forge weld being an intimate bond between two parts brought up to a very high temperature.

By way of example, in the case of steels, two parts can be forge-welded when the temperature of the two parts is between about 1200° C. and the melting point of the said steel.

In this particular instance, in order to produce such a forge weld in addition to the fusion welding of the upper part of the joint, compression is applied to the tube, that is to say, that there is applied to at least part of the external surface of the tube, a force that tends to move the two edges to be forged closer together, which edges are brought up to a temperature higher than the minimum temperature needed to obtain such a forge weld using the energy supplied by fusion, which propagates into the thickness of the tube and in particular into the lower part of the welded joint, which can be forge welded.

Figure 13:
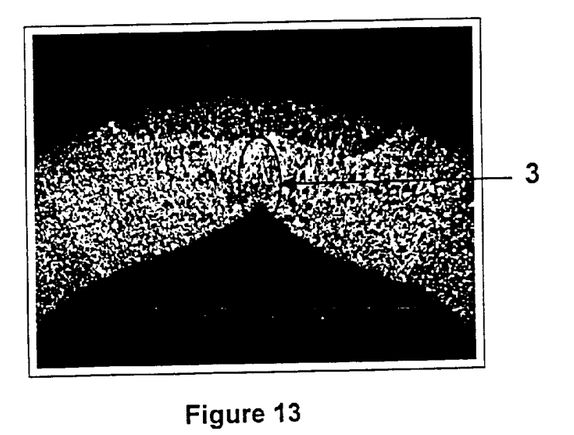

Such forging is depicted in FIG. 13, which presents a part view in transverse section of a tube manufactured by the method according to the invention.

In this FIG. 13, the welded joint consists of a darker, upper, first part which is fusion-welded, and of a lower part which is forge welded; the forge-welded region being substantially the axis of symmetry of the line 3.

In fact, this region of the thickness of the tube that can undergo such forge welding corresponds approximately to the region which is at a temperature of at least 1200° C. on the internal face of the tube, namely:

- the region corresponding to X=−110 mm to X=−245 mm in FIG. 9b and
- the region corresponding to X=−135 mm to X=−260 mm in FIG.10b.

We claim:

1. Method of manufacturing a metal tube from a metal sheet having two substantially straight and parallel longitudinal edges, which comprises:

welding the two longitudinal edges together by using a welding method employing at least three electrical arcs between at least three electrodes with the metal sheet being in contact with at least three corresponding ground leads;

wherein the plane of each ground lead is positioned at a distance of between −5 mm and +25 mm with respect to the plane of each corresponding electrode, the positive direction being the direction of relative travel of the metal sheet with respect to the electrodes.

2. Method according to claim 1, wherein the electrode-plane/ground-lead-plane distance is between 0 mm and +20 mm.

3. Method according to claim 2, wherein the electrode-plane/ground-lead-plane distance is between +7 mm and +15 mm.

4. Method according to claim 1, wherein the separations between the electrodes are adjusted in order to ensure that the foot of each electric arc attaches to solidified metal.

5. Method according to claim 1, wherein the separation between successive first and second electrodes is less than or equal to the separation between successive second and third electrodes.

6. Method according to claim 1, wherein the intensity of the current passing through an electrode is greater than or equal to 50 A.

7. Method according to claim 6, wherein the intensity of the current passing an electrode is greater than or equal to 100 A.

8. Method according to claim 1, wherein the relative speed of travel of the sheet is greater than or equal to 2 m.s$^{-1}$.

9. Method according to claim 8, wherein the relative speed of travel of the sheet is greater than or equal to 5 m.s$^{-1}$.

10. Method according to claim 1, further comprising a stage of chamfering at least part of the two longitudinal edges of the metal sheet, so that the sheet presents, prior to welding, a V-shaped groove with a V-angle of between about 30° and about 120°.

11. Method according to claim 10, wherein the groove has a height of between ⅓ and about ⅔ of the thickness of the metal sheet.

12. Method according to claim 1, wherein the metal sheet is filled with at least one filler prior to welding.

13. Method according to claim 1, wherein the two longitudinal edges of the metal sheet are welded together incompletely by partial fusion of about 20% to about 80% of the thickness of the sheet at said edges.

14. Method according to claim 13, wherein the edges are also forge-welded together by applying a lateral-mechanical pressure to at least part of the outside wall of the sheet, so as to obtain a substantially complete weld throughout the thickness.

15. Method according to claim 1, wherein after welding the tube undergoes at least one stage of drawing, rolling and recrystallization annealing.

16. Apparatus for manufacturing a metal tube from a metal sheet having two substantially straight and parallel longitudinal edges, which comprises:

electric-arc welding means for welding together the two longitudinal edges of the metal sheet;

at least three electrodes and at least three corresponding ground leads;

each ground lead being positioned at a distance of between −5 mm and +25 mm with respect to each electrode, the positive direction being the direction of relative travel of the metal sheet with respect to set at least three electrodes.

* * * * *